United States Patent
Granström et al.

(10) Patent No.: US 9,816,435 B2
(45) Date of Patent: Nov. 14, 2017

(54) METHOD AND SYSTEM FOR CONTROLLING A TURBOCHARGED ENGINE DURING AN UPSHIFT

(71) Applicant: SCANIA CV AB, Södertälje (SE)

(72) Inventors: Magnus Granström, Hägersten (SE); Anders Larsson, Tullinge (SE)

(73) Assignee: SCANIA CV AB (SE)

( * ) Notice: Subject to any disclaimer, the term of this patent is extended or adjusted under 35 U.S.C. 154(b) by 94 days.

(21) Appl. No.: 14/787,071

(22) PCT Filed: Apr. 29, 2014

(86) PCT No.: PCT/SE2014/050519
§ 371 (c)(1),
(2) Date: Oct. 26, 2015

(87) PCT Pub. No.: WO2014/178781
PCT Pub. Date: Nov. 6, 2014

(65) Prior Publication Data
US 2016/0084159 A1   Mar. 24, 2016

(30) Foreign Application Priority Data
Apr. 30, 2013  (SE) ..................... 1350530

(51) Int. Cl.
*F02B 61/06* (2006.01)
*F02D 41/00* (2006.01)
(Continued)

(52) U.S. Cl.
CPC ............ *F02B 61/06* (2013.01); *B60W 10/06* (2013.01); *B60W 30/19* (2013.01); *F02B 37/16* (2013.01);
(Continued)

(58) Field of Classification Search
CPC ...... B60W 10/06; B60W 20/30; B60W 20/15; B60W 2510/0633; B60W 2710/06; F02D 41/0007; F02M 35/10157; F02M 35/10163
See application file for complete search history.

(56) References Cited

U.S. PATENT DOCUMENTS 4,774,858 A * 10/1988 Ganoung ............... B60W 10/06
477/100
6,408,623 B1 * 6/2002 Mollier ................... B60T 11/16
60/588
(Continued)

FOREIGN PATENT DOCUMENTS

DE       197 12 850 A1    10/1998
DE    102004048826 A1     4/2006
(Continued)

OTHER PUBLICATIONS

International Search Report dated Aug. 29, 2014 issued in corresponding International patent application No. PCT/SE2014/050523.

*Primary Examiner* — Long T Tran
(74) *Attorney, Agent, or Firm* — Ostrolenk Faber LLP

(57) ABSTRACT

A method for propulsion of a vehicle (100) having a combustion engine (101) and a gearbox. (103), the engine (101) having a combustion chamber with an inlet for supply of combustion gas and an outlet for evacuation of exhaust gas, the method includes, during a change of gear from a first higher to a second lower gear ratio, increasing the pressure ($P_{ut}$) at the chamber outlet (202) with a turbocharger unit and, when the rate of revolution (n) of the combustion engine (101) has at least partially fallen, controlling the turbocharger unit (203) such that the combustion gas pressure ($P_{in}$) is increased.

28 Claims, 5 Drawing Sheets

(51) Int. Cl.
  *F02B 37/16*    (2006.01)
  *F02D 41/02*    (2006.01)
  *B60W 30/19*    (2012.01)
  *F16H 63/50*    (2006.01)
  *B60W 10/06*    (2006.01)
  *F02B 37/22*    (2006.01)
  *F02D 9/06*     (2006.01)
  *F16H 61/04*    (2006.01)
  *F02B 37/18*    (2006.01)
  *F02D 41/14*    (2006.01)
  *F02D 35/02*    (2006.01)

(52) U.S. Cl.
  CPC ....... *F02D 41/0007* (2013.01); *F02D 41/023* (2013.01); *F16H 63/502* (2013.01); *B60W 2710/0638* (2013.01); *B60W 2710/0644* (2013.01); *B60W 2710/0683* (2013.01); *F02B 37/18* (2013.01); *F02B 37/22* (2013.01); *F02D 9/06* (2013.01); *F02D 35/023* (2013.01); *F02D 41/145* (2013.01); *F16H 61/04* (2013.01); *Y02T 10/144* (2013.01)

(56) References Cited

U.S. PATENT DOCUMENTS

| | | | |
|---|---|---|---|
| 6,408,625 B1* | 6/2002 | Woon | F02D 17/02 123/198 F |
| 8,381,521 B2* | 2/2013 | Schaffeld | F02D 41/0007 123/559.1 |
| 2007/0111853 A1 | 5/2007 | King et al. | |
| 2010/0199666 A1* | 8/2010 | VanDyne | F02B 37/105 60/605.2 |
| 2012/0103314 A1* | 5/2012 | Jackson | F02B 41/06 123/70 R |
| 2012/0201657 A1* | 8/2012 | Donnelly | F02C 6/20 415/123 |
| 2012/0221223 A1* | 8/2012 | Schaffeld | F02B 33/38 701/102 |
| 2012/0266595 A1* | 10/2012 | Buschur | F02B 37/10 60/607 |

FOREIGN PATENT DOCUMENTS

EP    2 366 879 A2    9/2011
WO   WO 2012/121657 A1   9/2012

\* cited by examiner

METHOD AND SYSTEM FOR CONTROLLING A TURBOCHARGED ENGINE DURING AN UPSHIFT

CROSS-REFERENCE TO RELATED APPLICATIONS

The present application is a 35 U.S.C. §§371 national phase conversion of PCT/SE2014/050519, filed Apr. 29, 2014, which claims priority of Swedish Patent Application No. 1350530-0, filed Apr. 30, 2013, the contents of which are incorporated by reference herein. The PCT International Application was published in the English language.

TECHNICAL AREA

The present invention relates to propulsion of vehicles, and in particular to a method performed during the changing of gears. The invention also concerns also a system and a vehicle, and a computer program and a computer program product, that implement the method according to the invention.

BACKGROUND OF THE INVENTION

The background description below of the invention does not necessarily describe prior art technology.

A number of different propulsion chain configurations are used with respect to vehicles in general. A gearbox, for example, may be constituted by a manually changed gearbox or an automatically changed gearbox. It is often desirable that heavy vehicles be propelled in a manner that is as comfortable as possible for the driver. This normally means that changes of gear in the gearbox should be carried out automatically, with the aid of control systems of the vehicle. The use of automatic gearboxes in heavy vehicles has, therefore, become more common.

Automatic gear changing for heavy vehicles is often constituted by a change of gear of "manual" gearboxes in which the change operation is controlled by a control system. Such gearboxes thus comprise one pair of cogged wheels for each gear, where the gear ratios are distributed at appropriate intervals. This type of gearbox has the advantage of often demonstrating a higher efficiency than conventional automatic gearboxes. A clutch for such gearboxes may be constituted by a clutch that is controlled automatically by the control systems of the vehicle, in order to couple the engine of the vehicle to the gearbox.

In principle, the clutch in such vehicles needs to be used only during start of the vehicle from stationary, since other gear changing can be carried out by the control systems of the vehicle without the clutch being opened. In cases in which the clutch is constituted by an automatic clutch controlled by the control systems of the vehicle, however, the clutch is often used to open and close the propulsion chain also during change of gear.

Independently of whether the clutch is used during change of gear or not, in order to obtain as comfortable a change of gear as possible, it is required that the driving force in the propulsion chain during the change of gear, and thus also the associated interruption in driving force during change of gear, are controlled such that undesired jerking motion does not occur, while at the same time it is often desirable that the change of gear be carried out with a relatively short interruption in driving force.

SUMMARY OF THE INVENTION

It is one object of the present invention to provide a method for propulsion of a vehicle in which regulation of the rate of revolution of the combustion engine during change of gear is carried out to make both rapid and predictive regulation possible, while at the same time, a desired driving force is available after the change of gear. The present invention relates specifically to a method for the propulsion of a vehicle, wherein the said vehicle comprises a combustion engine and a gearbox that can be adjusted to a number of gear ratios for the transfer of a force between the combustion engine and at least one driving wheel. The combustion engine comprises at least one combustion chamber with at least one inlet for supply of combustion gas and at least one outlet for evacuation of an exhaust gas flow that has resulted from combustion in the combustion chamber, and further comprising a turbocharger unit for pressurizing the combustion gas.

During a change of gear from a first higher gear ratio to a second lower gear ratio, wherein the rate of revolution of the combustion engine is reduced from a first rate of revolution to a second rate of revolution, the method comprises:

increasing the pressure at the outlet at least through the use of the turbocharger unit for constriction of the exhaust gas flow, reducing the pressure at the combustion gas through the opening of a first valve, and when the rate of revolution of the said combustion engine has at least partially fallen towards the said second rate of revolution, to control the turbocharger unit such that the combustion gas pressure is increased.

As mentioned above, gearboxes of the type that are normally used in manually geared vehicles are often used for heavy vehicles, but where the change of gear is carried out automatically by the control system of the vehicle. Change of gear from one gear ratio to a second one with this type of gearbox comprises by its nature the interruption of the propulsion chain when the currently engaged gear is disengaged, and its subsequent reconnection when a new gear has been engaged.

The rate of revolution of the combustion engine must, however, be synchronised with (i.e. it must be controlled by) the expected rate of revolution of the input shaft of the gearbox with the new gear engaged, before the propulsion chain is reconnected, to avoid undesired jerks or oscillations during the change of gear. This change synchronization of the rate of revolution of the combustion engine can be carried out in several ways.

Gearing down can be carried out by accelerating the combustion engine with the aid of the supply of fuel, while the opposite can be carried out for gearing up to a higher gear, i.e. change of gear to a lower gear ratio, in that the combustion engine must be braked to the lower rate of revolution of the input shaft to the gearbox at the new (higher) gear. A clutch, for example, can be used during the change of gear, wherein the clutch can be used for synchronization of the rate of revolution of the combustion engine. If the clutch is used for synchronizing the rate of revolution of the combustion engine, however, this is preferably carried out with a slipping clutch in order to avoid jerks and oscillations in the propulsion chain. It may, however, be desirable to carry out the change of gear without slipping the clutch, for example, to reduce wear. It may be desirable also to change gear without use of the clutch at all, i.e. to use a process in which the prevalent gear is disengaged, after which the rate of revolution of the combustion engine is synchronised before a new gear is engaged, whereby, in combination with a suitable relief of torque, also a change of gear without the use of the clutch can be carried out without jerks. Furthermore, it is often desirable to carry out the change of gear as rapidly as possible, while at the same time retaining the ease of driving and the comfort of the vehicle.

It may, therefore, be desirable to brake the combustion engine by another method than with the aid of the clutch. The present invention provides a method to brake the combustion engine during gearing up that makes possible efficient braking of the combustion engine to a desired rate of revolution, which in turn makes a change of gear possible with a relatively short interruption in driving force. The invention has the further advantage that a large driving force becomes rapidly available if required after the change of gear.

According to the invention, braking of the combustion engine is achieved by increasing the pressure at the outlet of the combustion chamber at least through the use of the turbocharger unit for constriction of the exhaust gas flow, for example, by constricting the exhaust gas flow by means of the turbine of the turbocharger unit, such that the pressure at the outlet of the combustion chamber is increased. Furthermore, the turbine can be regulated during the constriction of the exhaust gas flow such that the rate of revolution of the turbine amounts, for example, to a rate of revolution in the range of 30-100% of the maximum working rate of revolution of the turbine or, for example, a rate of revolution in the range of 80-100% of the maximum working rate of revolution of the turbine, i.e. the maximum rate of revolution at which the turbine is allowed to rotate during propulsion of the vehicle.

Furthermore, the pressure at the combustion gas is reduced through the opening of a first valve that acts against the inlet pressure, wherein the inlet pressure can be reduced, for example, to the pressure that surrounds the vehicle. The valve may be constituted by, for example, a blow-off valve that is conventionally present at turbocharger units, or another suitable valve by which a reduction in pressure to the pressure that surrounds the vehicle (atmospheric pressure) can be achieved for the combustion gas at the inlet. In summary, this results in a high differential pressure across the combustion engine, with an efficient braking associated with this.

A high differential pressure across the combustion engine is achieved by these measures, whereby a corresponding relatively large braking force is obtained with which the rate of revolution of the combustion engine can be reduced, whereby the rate of revolution of the combustion engine can be efficiently reduced to the desired rate of revolution.

It is, however, desirable during change of gear not only that the rate of revolution of the combustion engine is braked in a short period of time to the desired rate of revolution, but also often that a high torque can be delivered by the combustion engine immediately after, or essentially immediately after, the change of gear has been carried out. This, however depends on the availability of compressed combustion gas, such as air, i.e. at a high inlet pressure, which however is, not desirable from the point of view of braking the engine. The present invention, however, makes efficient braking of the combustion engine during the synchronization possible, while at the same time a high extraction of torque is made possible immediately after, or essentially immediately after, the change of gear. This is achieved by first reducing the inlet pressure, and subsequently starting an increase in the inlet pressure before the propulsion chain is again closed. Since an increase in pressure of the combustion gas is started before the new gear has been engaged and the propulsion chain has again been connected, combustion gas under pressure will be available immediately after the propulsion chain has been connected after the change of gear such that a higher driving force can be made available.

According to one preferred embodiment, an increase in pressure of the combustion gas is started before the rate of revolution of the combustion engine has fallen to the second rate of revolution.

By maintaining the rate of revolution of the turbine, and thus also the rate of revolution of the compressor, at a high level during the reduction in the rate of revolution of the combustion engine, it is possible to subsequently increase rapidly the pressure of the combustion gas to make a large torque possible, if this is required after the change of gear, which can often can be the case, for example when the gearing up has been caused by the vehicle undergoing an increase in speed. According to one embodiment of the present invention, the turbine is first closed in order to obtain as rapid build up of pressure as possible at the outlet of the combustion chamber before the inlet pressure is reduced.

The turbine may be controlled during reduction in its rate of revolution in such a manner that its speed of rotation is maintained at a high speed of rotation, such as, for example, a maximum speed of rotation or a speed of rotation that amounts to, for example, a freely chosen speed of rotation in any one of the ranges 50-100% or 80-100% of the maximum speed of rotation of the turbine during propulsion of the vehicle. By maintaining a high speed of rotation of the turbine, and thus also a high speed of rotation of the compressor, it is possible to make compressed air rapidly available when the first valve is closed, whereby compressed air can be made available essentially immediately when driving force is again required. The first valve can be kept open during the period that a low inlet pressure is desired, and it can be closed when an increase of the inlet pressure is required, whereby a rapid build up of pressure is obtained since the compressor can already rotate at the desired speed.

Furthermore, the outlet pressure may be arranged not only to be regulated with the aid of the turbine, but also, for example, together with a constriction device located downstream of the turbine, for example, an exhaust gas brake system.

The method according to the present invention can be implemented with the aid, for example, of at least one of: one or several processors, one or several FPGA (field-programmable gate array) circuits, and one or several ASICs (application-specific integrated circuit).

Further characteristics of the present invention and its advantages will be made clear by the following detailed description of embodiments given as examples, and the attached drawings.

DETAILED DESCRIPTION OF EMBODIMENTS

Figure 1A:
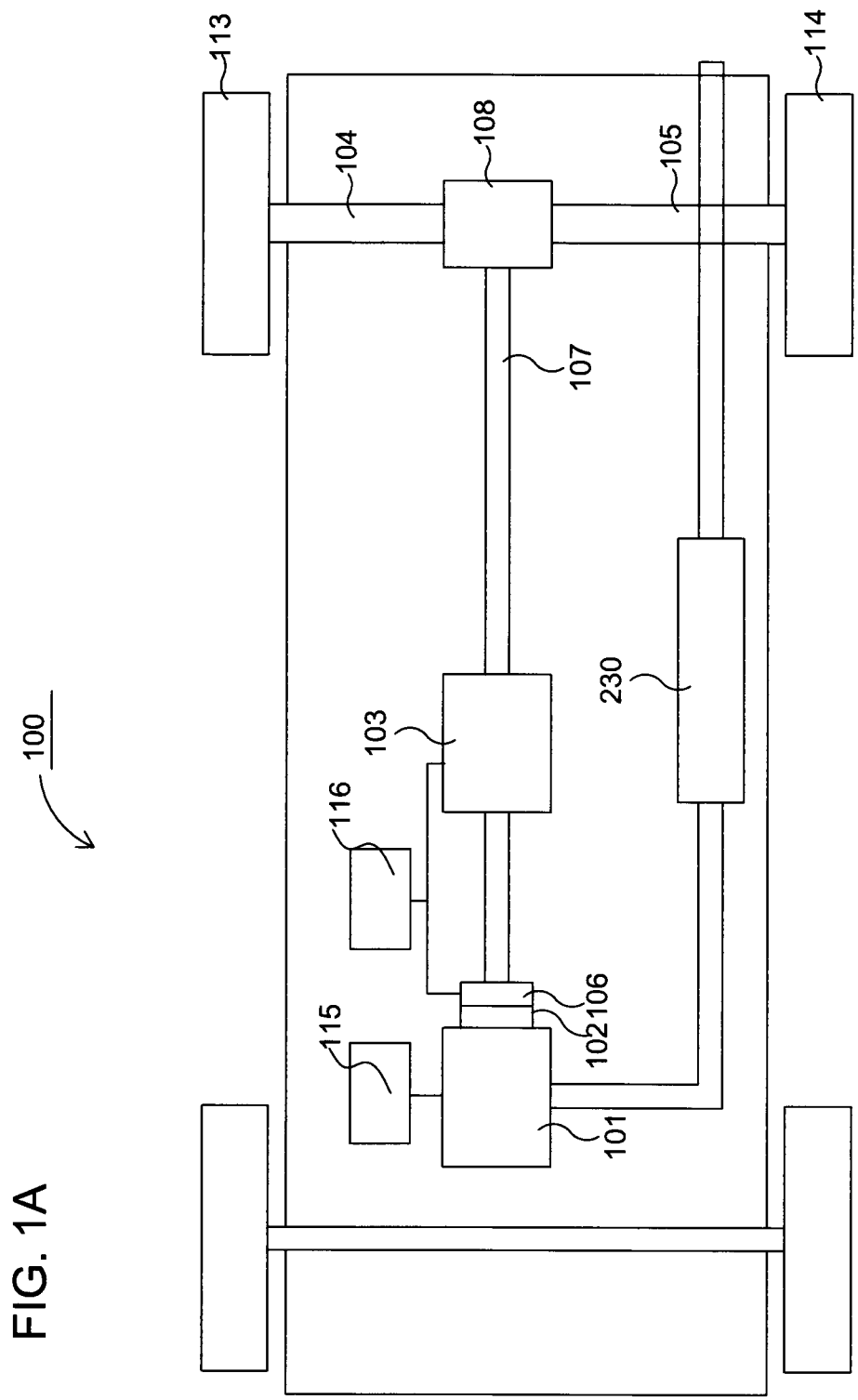
FIG. 1A shows schematically a vehicle on which the present invention can be used.

FIG. 1A shows schematically a propulsion chain in a vehicle 100 according to one embodiment of the present invention. The vehicle shown schematically in FIG. 1A comprises only one axle with driving wheels 113, 114, but the invention can be applied also for vehicles in which more than one axle is provided with driving wheels, and also for vehicles with one or several further axles, such as one or several support axles. The propulsion chain comprises a combustion engine 101, which is connected to a gearbox 103 through a clutch 106 in a conventional manner, through an output shaft at the combustion engine 101, normally through a flywheel 102.

The combustion engine 101 is controlled by the control systems of the vehicle through a control unit 115. In the same manner the clutch 106, which may be constituted by, for example, an automatically controlled clutch, and the gearbox 103 are controlled by the control systems of the vehicle 100 with the aid of one or several suitable control units: in FIG. 1A controlled by the control unit 116. The propulsion chain of the vehicle 100 may, of course, be of another type.

An output shaft 107 from the gearbox 103 drives the driving wheels 113, 114 through a final gear 108 such as, for example, a conventional differential gear, and drive shafts 104, 105 connected to the said final gear 108. The present invention is applicable also for hybrid vehicles, where, in addition to a combustion engine, one or several further sources of power, such as one or several electric motors, can be used for propulsion of the vehicle.

The vehicle 100 comprises further an exhaust gas system with a post-processing system 230 for the processing (cleaning) of exhaust emissions that result from the combustion in the combustion chamber of the combustion engine 101.

Figure 2:
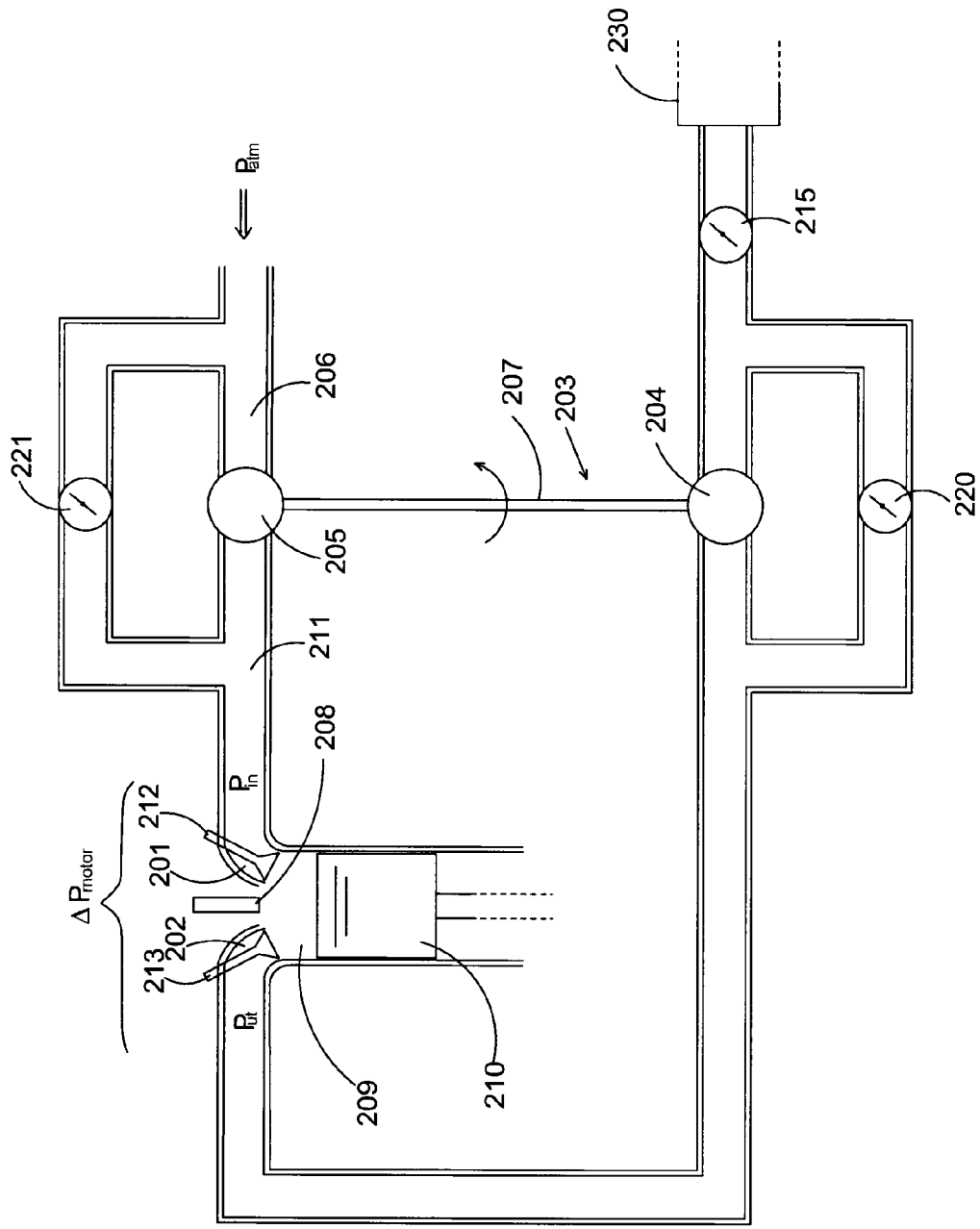
FIG. 2 shows schematically in more detail the post-treatment system for the vehicle shown in FIG. 1A.

FIG. 2 shows the combustion engine 101 schematically in somewhat greater detail. There is shown in the drawing only one cylinder/combustion chamber 209 for the combustion engine 101, with a piston 210 that operates within the cylinder, but the combustion engine 101 is constituted in the present example by a six-cylinder combustion engine, and it may generally be constituted by an engine with a freely chosen number of cylinders/combustion chambers, such as, for example, a freely chosen number in the range 1-20, or even more. Combustion engines of the type shown generally comprise also at least one fuel injector 208 for each combustion chamber (cylinder) 209, which fuel injectors supply in conventional manner fuel to the said combustion chamber 209 for combustion.

Furthermore, each combustion chamber 209 comprises an inlet 201 for the supply of combustion gas, which is generally constituted at least partially by air, to the combustion process, through an inlet suction line 211, and an outlet 202 for the evacuation of the exhaust gas flow that results from the combustion. The supply of combustion gas and the evacuation of the combustion chamber may be controlled in conventional manner by, for example, valves 212, 213.

The exhaust gases (the exhaust gas flow) that are generated during the combustion are subsequently led through a turbocharger unit 203 and an exhaust gas brake system 215 to the post-processing system 230 for the post-processing (cleaning) of the exhaust gas flow before the exhaust gases are released into the surroundings of the vehicle 100. The post-processing system 230 may comprise in conventional manner, for example, at least one of diesel particle filters, oxidation catalysers and SCR catalysers. The post-processing system may comprise also several and other types of component, as is well-known to one skilled in the arts. The post-processing system is not described in detail here.

The use of the turbocharger unit according to FIG. 2 means, furthermore, that the combustion engine 101 becomes supercharged, i.e. the pressure of the combustion gas supplied to the combustion chambers exceeds the pressure that surrounds the vehicle 100.

This supercharging is achieved in the present example with the aid of the turbocharger unit 203, which comprises a turbine 204 and a compressor 205 that is driven by the turbine 204 through a shaft 207. The compressor 205 compresses, i.e. places under pressure, gas that is supplied through an inlet 206, such as air from the surroundings of the vehicle, possibly also together with conventional recirculation of exhaust gases, known as EGR (not shown in the drawings), for supply to the inlet suction line 211. The ability of the compressor 205 to compress incoming air is controlled by the force or speed with which the turbine 204 rotates. The turbine 204 is, in turn, driven by exhaust gases, which means that its force or speed of rotation is controlled by the passing exhaust gas flow.

The turbocharger unit 203 that is shown is of a type with fixed geometry, which means that the exhaust gas flow that passes the turbine is used for driving it. Since, however, it is often desirable that the turbine, and thus also the pressure of the combustion gas, can be regulated, the solution shown in FIG. 2 is provided with means to make such a regulation possible. These means are constituted in the example shown by what is known as a wastegate valve 220, which can regulate in a controllable manner the fraction of the exhaust gas flow that results from the combustion that actually passes, and thus drives the turbine 204. This regulation is carried out by diverting in a manner that can be controlled with the aid of the wastegate valve 220 a fraction of the exhaust gas flow past the turbine 204, whereby the speed of rotation of the turbine can be regulated with the aid of the wastegate valve 220 to the desired rate of revolution, which is normally constituted by a very high rate of revolution, for example, a rate of revolution of the magnitude of 100,000-200,000 rpm.

The solution shown in FIG. 2 comprises also what is known as a blow-off valve 221, that acts against the high-pressure side of the compressor 205, and that can be used when required to reduce rapidly the pressure $P_{in}$ of the combustion gas. The blow-off valve 221 may be of a different type, as is known, and it may be constituted by, as is indicated in FIG. 2, a recirculating blow-off valve, which means that combustion gas from the high-pressure side of the compressor is recirculated to the low-pressure side of the compressor, whereby the pressure at the high-pressure side of the compressor 205 is reduced.

The blow-off valve may be also of atmospheric type, i.e. combustion gas from the high-pressure of the compressor is released into the surroundings of the vehicle. The blow-off valve may be also of a type that combines both of the functions described above, i.e. combustion gas from the high-pressure side can be released into the surroundings and recirculated. The combustion gas may be arranged also to be released into the exhaust gas system in order to make possible reduction of the noise that can arise during large and sudden changes in pressure.

Figure 3:
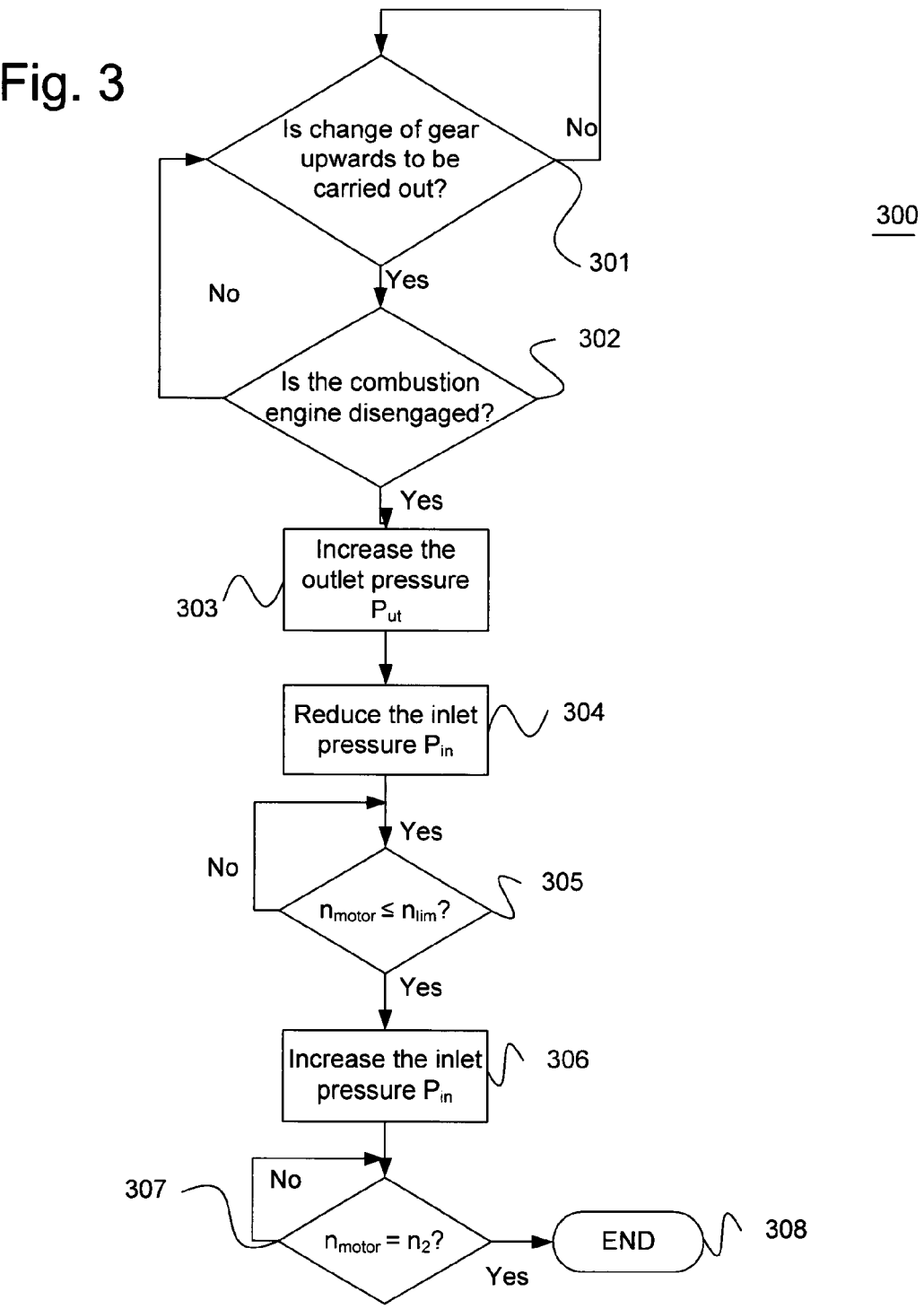
FIG. 3 shows an example method according to the present invention.

The operation of the turbocharger unit 203 is used, according to the present invention, during the control of the change of gear in which change of gear takes place from a lower gear to a higher gear (i.e. from a higher gear ratio to a lower gear ratio). As has been mentioned above, it is generally true that the rate of revolution n of a combustion engine changes during change of gear, where change of gear from a lower gear to a higher gear leads to the rate of revolution n of the combustion engine becoming lower by a rate of revolution that corresponds to the change in gear ratio, and possibly also change of speed of the vehicle during the change of gear. During change of gear to a higher gear during propulsion of the vehicle, it is often desirable that the change of gear can be carried out in a short period, for example, in order to avoid interruption in the supply of driving force. The present invention concerns a method to brake the rate of revolution of the combustion engine in an efficient manner from the rate of revolution of the previous gear to the rate of revolution of the new gear, during change of gear to a higher gear. An example method 300 according to the present invention is shown in FIG. 3, where the method 300 according to the present example is arranged to be carried out by the engine control unit 115 shown in FIGS. 1A and 1B.

Figure 1B:
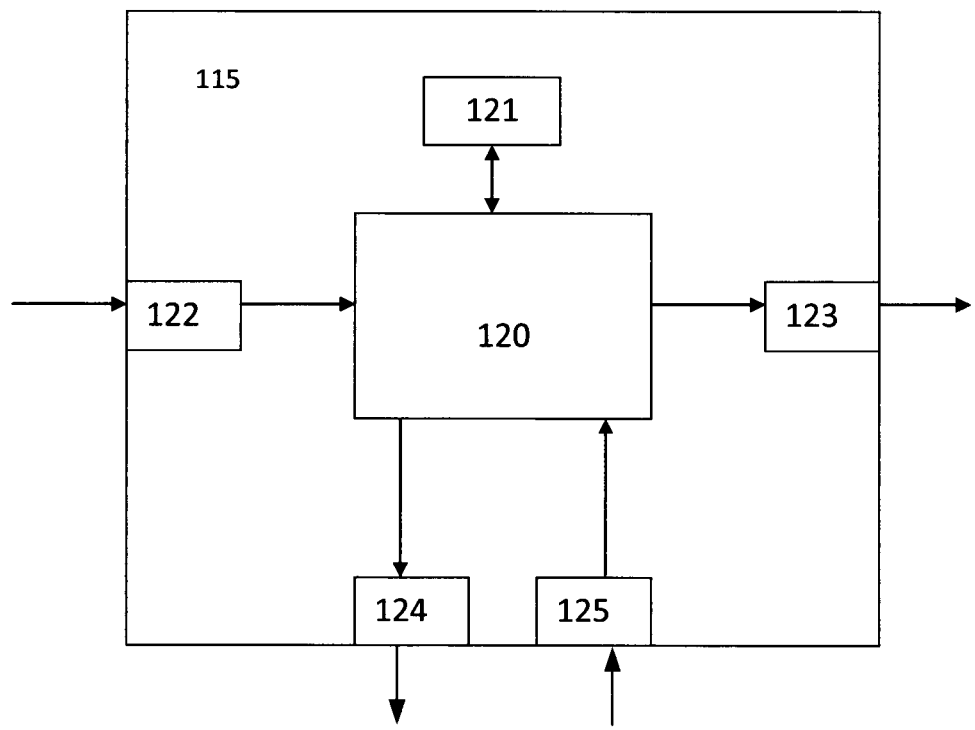
FIG. 1B shows a control unit in the control system for the vehicle shown in FIG. 1A.

Control systems in modern vehicles generally consist of a communication bus system that consists of one or several communication buses in order to connect a number of electronic control units (ECUs), such as the control units, or controllers, 115, 116, and various components arranged at the vehicle. Such a control system may comprise a large number of control units, and the responsibility for a particular function may be distributed among more than one control unit. Furthermore, the invention may be implemented in a control unit dedicated to the present invention, or fully or partially implemented in one or several other control units that are already present at the vehicle. For reasons of simplicity, only the control unit 116 is shown in FIGS. 1A and 1B, in addition to the engine control unit 115.

The operation of the control unit 115 (or of the control unit or units in which the present invention has been implemented) according to the present invention may depend, for example, on signals from, for example, the control unit 116 with respect to, for example, the status of the clutch or gearbox. Signals may also be sent in a similar manner to the control unit 116. Control of the control unit 115 may depend also on sensor signals with respect to, for example, the turbocharger unit 203, such as, for example, its speed of rotation, the wastegate valve 220, or the blow-off valve 221, as described below. It is generally the case that control units of the type shown are normally arranged to receive sensor signals from various parts of the vehicle, such as from various control units arranged at the vehicle.

The control is often controlled by programmed instructions. These programmed instructions are typically constituted by a computer program, which, when it is executed in a computer or control unit, ensures that the computer or control unit carries out the desired control, such as the method steps according to the present invention.

The computer program normally constitutes part of a computer program product, where the computer program product comprises a suitable storage medium 121 (see FIG. 1B) with the computer program stored on the storage medium 121. The digital storage medium 121 may be constituted by, for example, any one of the group: ROM (Read-Only Memory), PROM (Programmable Read-Only Memory), EPROM (Erasable PROM), Flash memory, EEPROM (Electronically Erasable PROM), a hard disc unit, etc., and it may be arranged in or in connection with the control unit, whereby the computer program is executed by the control unit. Thus, the behavior of the vehicle in a particular situation can be adapted by changing the instructions of the computer program.

An example of a control unit (the control unit 115) is shown schematically in FIG. 1B, whereby the control unit may in turn comprise a calculation unit 120, which may be constituted by, for example, any appropriate type of processor or microcomputer, for example, a circuit for digital signal processing (a digital signal processor, DSP), or a circuit with a predetermined specific function (an application-specific integrated circuit, ASIC). The calculation unit 120 is connected to a memory unit 121 that supplies the calculation unit 120 with, for example, at least one of the stored program code and the stored data that the calculation unit 120 requires in order to be able to carry out calculations. The calculation unit 120 is arranged also to store the intermediate or final results of calculations in the memory unit 121.

The control unit is further provided with arrangements 122, 123, 124, 125 for the reception and transmission of input and output signals. These input and output signals may contain waveforms, pulses, or other properties that can be detected by the arrangements 122, 125 for the reception of input signals as information to be processed by the calculation unit 120. The arrangements 123, 124 for the transmission of output signals are arranged to convert calculation results from the calculation unit 120 into output signals for transfer to at least one of other parts of the control systems of the vehicle and the component or components for which the signal is intended. Each one of the connections to the arrangements for reception and transmission of input and output signals may be constituted by one or several of a cable; a computer bus, such as a CAN bus (controller area network bus), a MOST bus (media-oriented systems transport), or any other bus configuration; or a wireless connection.

Consider again FIG. 3, which shows an example of a method 300 according to the present invention. The method starts at step 301, where it is determined whether a change of gear upwards is to take place. The method continues to step 302 if this is the case. It is determined in step 302 whether the combustion engine 101 has been disengaged from the driving wheels 113, 114 of the vehicle 100, which may be carried out by, for example, opening the clutch 106 or by placing the gearbox 103 into its neutral condition.

One purpose of the present invention is to reduce the rate of revolution of the combustion engine 101 to the desired rate of revolution as rapidly as possible, i.e. to minimise the time it takes for the combustion engine to reach the desired rate of revolution, where this desired rate of revolution is constituted by the synchronization rate of revolution for the gear that is to be engaged.

Figure 4:
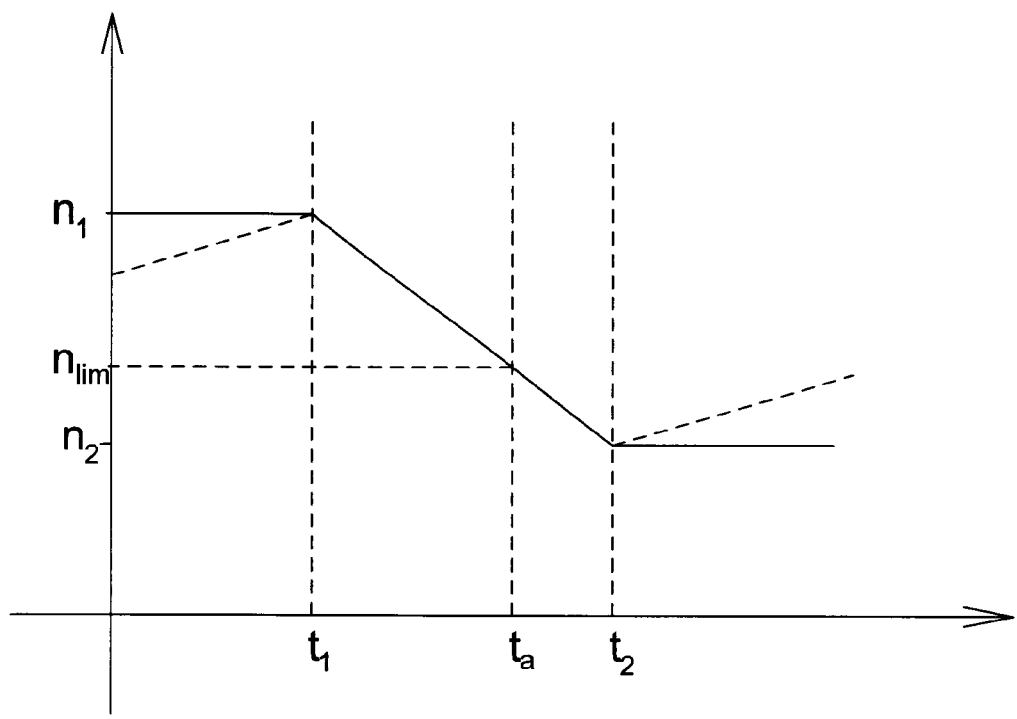
FIG. 4 shows an example of a reduction in rate of revolution according to the present invention.

This is made clear in FIG. 4, where a diagram of the rate of revolution n of the combustion engine as a function of time is shown. The vehicle 100 is driven until time $t_1$ at a speed that results in a rate of revolution $n_1$ of the combustion engine, shown by the continuous line. If the vehicle is undergoing acceleration and is not being driven at a constant speed, the rate of revolution increases before the change of gear, which is indicated by the dashed line in the drawing. Change of gear to a higher gear is initiated at time $t_1$ (or at a suitable time before this), with the consequence that the rate of revolution of the combustion engine is to be reduced from the rate of revolution $n_1$ to the rate of revolution $n_2$. The more rapidly that the rate of revolution of the combustion engine can be reduced to $n_2$, the more rapidly can the change of gear be carried out. The reduction in the rate of revolution is achieved, according to the present invention, through braking of the combustion engine 101.

According to the present invention, this braking is achieved through an increase in the differential pressure $\Delta P_{motor}$ across the combustion engine, i.e. an increase in the difference in pressure between the inlet pressure $P_{in}$ and the outlet pressure $P_{ut}$ of the combustion chambers 209 (see FIG. 2). The higher that this difference in pressure is, i.e. the higher that the outlet pressure $P_{ut}$ is relative to the inlet pressure $P_{in}$, the more rapidly will the combustion engine 101 be braked to the desired rate of revolution $n_2$.

The method continues subsequently to step 303, where the outlet pressure $P_{ut}$ is increased through the closing of the wastegate valve 220, whereby a back pressure will arise upstream of the turbine 204 from the constriction that the turbine 204 constitutes, and thus also at the outlet 202 of the combustion chamber 209, and which back pressure will brake the combustion engine 101.

There are normally design limitations on how high a pressure can be allowed upstream of the turbine 204, for example, of a magnitude of 4-10 bar, for which reason the outlet pressure $P_{ut}$ can be regulated against a reference pressure $P_{ut\_ref}$. The outlet pressure $P_{ut}$ can be determined with the aid of a suitable pressure sensor arranged upstream of the turbine 204, in such a position as, for example, the outlet of the combustion engine 101 or at any other suitable location upstream of the exhaust gas brake system. The outlet pressure may be arranged to be determined also with the aid of, for example, a cylinder pressure sensor. The outlet pressure may be arranged also to be estimated based on an appropriate calculation model, for example based on a pressure measured at another suitable position in the system or based on another measured parameter, through the use of which it is possible to calculate the outlet pressure. It is generally the case that the higher that this back pressure is, the stronger will be the brake effect, and thus the more rapid will be the reduction in the rate of revolution of the combustion engine.

When the outlet pressure $P_{ut}$ is increased with the aid of the turbine 204 and by the closing of the wastegate valve 220, this leads at the same time to the turbine 204 accelerating. A maximum rate of rotation for the turbine has normally been defined that should not be exceeded for reasons of, for example, strength. This maximum can be rapidly reached when a large part of, or the complete, exhaust gas flow is led through the turbine 204 when the desired outlet pressure $P_{ut}$ is to be reached. The turbine 204 may, for this reason, be arranged to be regulated against the maximum rate of rotation. As an alternative, the regulation of the turbine 204 may be so arranged that the rate of rotation of the turbine 204 amounts to, for example, a rate of revolution in the range of 30-100% of the maximum rate of rotation of the turbine 204, or, for example, a rate of revolution in the range of 80-100% of the maximum rate of rotation of the turbine 204, i.e. the maximum rate of revolution at which the turbine 204 is permitted to rotate during propulsion of the vehicle.

The rate of rotation of the turbine 204 is controlled by the exhaust gas flow that passes through the turbine. This is regulated by the use of the wastegate valve 220, which diverts in a manner that can be controlled a part of the exhaust gas flow past the turbine 204, whereby an exhaust gas flow through the turbine can be obtained that results precisely in a desired speed of rotation of the turbine. Thus the wastegate valve 220 can be controlled based on the currently prevalent speed of rotation of the turbine.

It is, however, not guaranteed that the desired outlet pressure $P_{ut}$, which in this case is relatively high, can be obtained without exceeding the desired speed of rotation of the turbine 204, i.e. the back pressure that can be generated by the turbine is not necessarily sufficient to obtain the desired outlet pressure $P_{ut}$. Furthermore, it may be the case for certain combinations of combustion engine and turbocharger unit that, even if the desired pressure can be obtained, it may not be possible to maintain this when the load on the compressor is relieved, as described below.

For this reason, a further throttle valve arranged, according to one embodiment, in the exhaust gas system of the vehicle 100, which throttle valve may be constituted by, for example, the exhaust gas brake system 215, may be also used during the regulation. The exhaust gas brake system 215 is arranged downstream of the combustion engine 101, and is in the present example arranged also downstream of the turbocharger unit 203. The exhaust gas brake system 215 applies on request a controllable constriction of the exhaust gas flow, whereby this constriction gives rise to a back pressure upstream of the exhaust gas brake system 215. Thus the pressure on the low-pressure side of the turbine 204 can be raised with the aid of the exhaust gas brake system 215, whereby the difference in pressure across the turbine 204 can be reduced while the desired outlet pressure $P_{ut}$ can at the same time be maintained at the outlet of the combustion chambers for the braking of the motion of the pistons in the combustion chambers, while also at the same time the desired speed of the turbine can be maintained with the aid of suitable regulation of the exhaust gas brake system 215 and the wastegate valve 220.

Instead of using the exhaust gas brake, or in addition to using the exhaust gas brake, also a compression brake (also known as a decompression brake) may be used during braking of the combustion engine. When using a compression brake, the braking force during compression in the combustion chambers of the combustion engine can be used. Air is drawn in during compression braking and compressed in a conventional manner, but the outlet valves are opened when the pistons reach or approach top dead center in order to reduce the pressure of the combustion chamber, whereby the force generated by the compressed gas is not used during the subsequent expansion. This has the advantage also that an exhaust gas flow with higher energy in the form of higher pressure or temperature is obtained, which may be used, for example, to maintain to a higher degree the rate of revolution of the turbine at the desired rate of revolution, with the consequence that the desired driving force can be obtained more rapidly after change of gear since also an increase in pressure of the combustion air pressure can in this way be carried out. Furthermore, the higher energy content means that it is possible for the compressor to place a greater load on the turbine since a larger force can be used to drive the turbine during the build up of pressure of the combustion air pressure.

Furthermore, when the desired outlet pressure has been obtained, or when the desired outlet $P_{ut}$ has partially been obtained to an appropriate extent, the method continues to step 304, in which the combustion gas pressure is reduced, i.e. the pressure at the inlet 201 to the combustion chambers 209 is reduced. It would be possible to regulate the inlet pressure $P_{in}$ by regulating the speed of rotation of the compressor 205, i.e. by regulating the speed of rotation of the turbine 204, whereby it would be possible to control the turbine 204 in such a manner that compression of combustion gas is no longer carried out, or is carried out only to a very small extent, in order in this way to control the inlet pressure $P_{in}$ towards essentially the pressure that surrounds the vehicle 100, or at least a lower pressure than the pressure that is prevalent at time $t_1$.

Such a regulation of the compressor or turbine, however, requires regulation towards a very low rate of rotation of the compressor or turbine, which thus constitutes a conflicting desire to the regulation described above, in which the turbine is controlled towards as high a rate of revolution as possible.

For this reason, the regulation of the pressure of the combustion gas is instead carried out with the aid of the blow-off valve 221.

The blow-off valve 221 is thus opened in step 304, which means that the pressurised combustion gas is recirculated to the inlet side of the compressor, whereby the inlet pressure $P_{in}$ can be reduced to the pressure that is prevalent on the inlet side of the compressor, which is normally constituted by essentially atmospheric pressure.

A relatively high differential pressure across the combustion engine 101 can thus be achieved, which results in a relatively large braking force, at least when compared with that obtained by allowing the rate of revolution of the combustion engine 101 to fall to the idling rate of revolution without any load. This braking force will brake the combustion engine 101 towards the desired lower rate of revolution $n_2$.

It should be noted also that in the method described above, the outlet pressure is first raised, after which the pressure at the inlet is reduced. This leads to a rapid increase in pressure being obtained through the compressor 205 continuing to compress combustion gas and in this way carrying out work, which place a braking load onto the turbine 204, which thus also will brake with a greater force, when compared with that exerted by a turbine 204 that is not under load, the exhaust gas flow that passes through the turbine 204, whereby the outlet pressure $p_{ut}$ can be built up during a shorter period.

The build up of pressure is promoted also in that the greater exhaust gas flow, to which the pressurised inlet pressure continues to contribute during the build up of pressure.

The steps 303 and 304, however, can be arranged in an alternative embodiment to be carried out in the reverse order, or at the same time. This alternative embodiment is valid in particular in those cases in which also the exhaust gas brake 215 is used during the regulation of the outlet pressure $P_{ut}$.

It is subsequently determined in step 305 whether the rate of revolution $n_{motor}$ has been reduces to a rate of revolution $n_{lim}$. The rate of revolution $n_{lim}$ is constituted by a rate of revolution that lies below the rate of revolution $n_1$ and lies above the rate of revolution $n_2$. It is preferable that the rate of revolution $n_{lim}$ lie closer to the rate of revolution $n_2$ than the rate of revolution $n_1$. The rate of revolution $n_{lim}$ may be so arranged, for example, that it is constituted by a rate of revolution in which a freely chosen fraction in the range of 50-90%, or 70-95%, of the total change of rate of revolution $n_1$-$n_2$ that the combustion engine is to undergo has been carried out. This is indicated schematically in FIG. 4 at time $t_a$. Instead of determining in step 305 whether the rate of revolution of the combustion engine 101 has reached a certain rate of revolution $n_{lim}$, it can be determined whether the synchronization is expected to be completed within a certain time, i.e. when the synchronization has reached, for example, the time $t_a$ in FIG. 4, where the synchronization is expected to be completed when a time $t_2$-$t_a$ has passed.

No explicit determination of the rate of revolution of the combustion engine 101 is thus required, according to this embodiment. It may be desirable that the combustion engine 101 is braked with an essentially constant braking power, i.e. an essentially constant differential pressure across the combustion engine, and thus braked by linear braking as is shown in FIG. 4, since it then can be easily estimated when the synchronization is expected to be completed. In the case in which a non-constant braking force is applied, the end-point of the synchronization can be calculated instead with the aid of an applicable model. Since constant braking force is obtained by maintaining a constant differential pressure, $\Delta P_{motor}$, it is an advantage if the regulation can be so arranged that it acts during the regulation to maintain a constant $P_{ut}$=$P_{ut\_ref}$ and also a constant $P_{in}$.

When the rate of revolution of the combustion engine has subsequently reached $n_{lim}$, or the time $t_a$ has been reached, or both the rate of revolution of the combustion engine has reached $n_{lim}$ and the time has reached $t_a$, the method continues to step 306 in order to increase again the pressure $P_{in}$ of the combustion air in order to ensure that the desired driving force is available or can become available rapidly when driving force is again required after the change of gear. This raising of the inlet pressure $P_{in}$ takes place, according to the invention, through closing the blow-off valve 221, whereby the compressor 205 will again build up the combustion gas pressure.

The rate of rotation of the turbine 204, and thus also the rate of revolution of the compressor 205, are maintained in the method described above at a high level during the synchronization of the rate of revolution of the combustion engine 101 during the reduction of the rate of revolution of the combustion engine 101. This means that when the blow-off valve 221 is closed, it will be possible to raise very rapidly the pressure of the combustion gas since the compressor 205 can be arranged to rotate already at its maximum, or close to its maximum, speed of rotation in order to achieve the maximum, or close to the maximum, compression of the combustion gas. This makes possible, thus, that a large extraction of torque is possible, if required, immediately after a change of gear, which can often be the case, for example, when the change of gear upwards has been caused by the vehicle 100 undergoing an increase in speed.

The inlet pressure $P_{in}$ may be arranged to be controlled towards a suitable inlet pressure, such as an inlet pressure that was prevalent before the change of gear, or an inlet pressure that makes possible a build up of torque towards the maximum torque that can be developed by the combustion engine 101 with the desired rate of build up of torque when the propulsion chain is closed and driving force is again required.

The wastegate valve 220 and possibly also at least one of the exhaust gas brake system (the constriction device) 215 and the compression brake may be regulated at the same time during the regulation of the blow-off valve 221, not only to ensure that the exhaust gas flow through the turbine 204 is increased in order to deal with the increased load that arises when the work carried out by the compressor 205 is increased when the blow-off valve is closed, but also at the same time such that the desired pressure condition, for example, the outlet pressure $P_{ut}$ or the difference in pressure across the turbine 204, is maintained, such that it is possible to achieve the desired rate of revolution of the turbine, and thus the desired compression.

An increased inlet pressure $P_{in}$ with a maintained outlet pressure $P_{ut}$ will, as will be realized, reduce the relative difference in pressure across the combustion engine 101, and thus also the braking force that acts on the piston 210. This, in turn, means that the combustion engine will no longer be braked with the same preferably linear reduction in speed that was obtained up until the time $t_a$. Either consideration of this can be taken during the calculation of the time $t_2$ at which the synchronization is completed, through the use of, for example, an applicable model and, for example, determination of the variations of the inlet pressure and outlet pressure during the increase in inlet pressure, or the rate of revolution of the combustion engine 101 can be monitored in order to determine whether the synchronization rate of revolution has been reached.

According to one embodiment, the outlet pressure $P_{ut}$ can be allowed temporarily to exceed the reference pressure $P_{utlopp\_ref}$ with a corresponding increase in the inlet pressure $P_{in}$, in order in this way to maintain a constant differential pressure $\Delta P_{motor}$ across the combustion engine 101 during the complete, or at least during a major part of, the time period after $t_a$ until the time $t_2$ in FIG. 4. Whether or not this is possible depends, however, on tolerances for the components. It may, for example, be permitted to exceed for a short period the limitation on pressure at the outlet, which limitation applies to a pressure that is to be applied for a long period. The build up of pressure that has been initiated according to step 306 may be arranged to continue until it is determined in step 307 that the rate of revolution $n_{motor}$ of the combustion engine has reached the synchronization rate of revolution $n_2$. As long as this is not the case, the method may remain in step 307 while the inlet pressure is at the same time raised, whereby it may be determined in step 307 also whether the inlet pressure $P_{in}$ has reached the desired inlet pressure, in which case continued build up of pressure is no longer required, and whereby this can be taken into consideration during the regulation.

The method is subsequently terminated in step 308 when the synchronization rate of revolution $n_2$ has been reached, whereby the propulsion chain can again be closed in a suitable conventional manner, which is not within the scope of the present invention.

In summary, thus, the present invention provides a method that brakes in an efficient manner a combustion engine during gearing up by applying and preferably maximising a differential pressure across the combustion engine. The method at the same time provides good driving properties during propulsion of the vehicle by ensuring that a sufficiently high pressure of combustion gas is available immediately during the change of gear or shortly afterwards to make it possible for the combustion engine to supply a desired torque during propulsion of the vehicle.

The invention has been described in the description above in association with a turbocharger unit 203 with a turbine 204 of a type that has fixed geometry. According to one embodiment of the invention, a turbine with variable geometry is used instead. Such a turbine may, for example, be provided in known manner with several adjustable guide rails for the regulation of the amount of exhaust gas that is used to influence the turbine wheel, and the amount of exhaust gas that is allowed to pass the turbocharger unit without its energy being exploited for compression of the combustion air. The function of the turbine can thus be regulated with the aid of such adjustable guide rails, and the turbine can be, for example, regulated through the use of the guide rails as described above towards as high a rate of rotation as possible while the inlet pressure is at the same time held low by the blow-off valve. An exhaust gas brake system may be used during the regulation also in this case in order to obtain the desired pressure or speeds of rotation. However, a wastegate valve is not required according to this embodiment, since the flow that is used to drive the turbine can also be regulated by the turbine.

Furthermore, the present invention has been described above for examples associated with vehicles. The invention may, however, be applied at any freely chosen transport means or process in which a change of gear as described above is to be carried out, such as, for example, water-borne and airborne vessels with the change of gear process described above.

It should be noted also that the system can be modified according to various embodiments of the method according to the invention (and vice versa) and that the present invention is not in any way limited to the embodiments of the method according to the invention described above: it concerns and comprises all embodiments within the protective scope of the attached patent claims.

The invention claimed is:

1. A method for the propulsion of a vehicle, wherein the vehicle comprises:
a combustion engine having a rotatable shaft, a gearbox connected to the engine shaft and the gearbox is adjustable to a number of gear ratios for transfer of a force between the combustion engine and at least one driving wheel of the vehicle;
the combustion engine comprises at least one combustion chamber with at least one inlet for supply of combustion gas and at least one outlet for evacuation of an exhaust gas flow that results from combustion of the combustion gas in the combustion chamber;
the method comprises:
during a change of gear in the gearbox from a first higher gear ratio to a second lower gear ratio, wherein a rate of revolution of the combustion engine shaft is reduced from a first rate of revolution ($n_1$) to a second rate of revolution ($n_2$):
increasing the pressure ($P_{ut}$) at the outlet from the combustion chamber at least through the use of a turbocharger unit which is configured for constriction of the exhaust gas flow;
reducing the pressure ($P_{in}$) at the combustion gas inlet through the opening of a first valve; and
when the first rate of revolution ($n_1$) of the combustion engine shaft has at least partially fallen towards the said second rate of revolution ($n_2$), controlling the turbocharger unit such that the combustion gas pressure ($P_{in}$) is increased.

2. The method according to claim 1, further comprising:
at least partially increasing the pressure ($P_{ut}$) at the outlet before the first valve is opened.

3. The method according to claim 1, further comprising at least partially increasing the pressure ($P_{ut}$) at the outlet through increasing a fraction of the exhaust gas flow from combustion in the combustion chamber that is led through a turbine of the turbocharger unit for driving the turbine.

4. The method according to claim 3, wherein the exhaust gas flow that results from the combustion in the combustion chamber and is led through the turbine of the turbocharger unit for driving the turbine is regulated through use of a second valve located and configured for diversion of the complete exhaust gas flow, or a part of the exhaust gas flow, past the turbine.

5. The method according to claim 1, further comprising at least partially increasing the pressure ($P_{ut}$) at the outlet of the combustion chamber through regulating the turbine such that the fraction of the exhaust gas flow from the combustion in the combustion chamber is increased and is used to drive the turbine of the turbocharger unit.

6. The method according to claim 3, further comprising regulating the turbine such that the turbine has a rate of revolution in the range of 30-100% of the maximum working rate of revolution of the turbine.

7. The method according to claim 3, further comprising regulating the turbine such that a rate of revolution of the turbine is essentially a maximum working rate of revolution of the turbine.

8. The method according to claim 1, further comprising maintaining the pressure ($P_{ut}$) at the outlet essentially constant during the reduction in the rate of revolution, at least until starting the raising of the combustion gas pressure.

9. The method according to claim 1, further comprising increasing the pressure ($P_{ut}$) at the outlet from the combustion chamber to a pressure that amounts to at least double the pressure that surrounds the vehicle.

10. The method according to claim 1, further comprising: increasing the pressure ($P_{ut}$) at the outlet from the combustion chamber at least partially through use of a constriction device other than the first valve, and the constriction device is arranged downstream of at least one of the combustion chamber outlet and the turbine.

11. The method according to claim 1, further comprising: increasing the pressure ($P_{ut}$) at the outlet from the combustion chamber at least partially through use of a compression brake.

12. The method according to claim 1, further comprising: closing the first valve during the raising of the pressure ($P_{in}$) of the combustion gas.

13. The method according to claim 1, further comprising: the controlling of the turbocharger unit and the first valve for starting an increase in the combustion gas pressure ($P_{in}$) before the rate of revolution (n) of the combustion engine shaft has fallen to the second rate of revolution ($n_2$) of the combustion engine shaft.

14. The method according to claim 1, further comprising starting raising of the combustion gas pressure ($P_{in}$) when the rate of revolution (n) of the combustion engine shaft has fallen to a rate of revolution ($n_{lim}$) that is constituted by a second rate of revolution ($n_2$) plus a selected value in the range of 10-50% of the difference in a rate of revolution between a first rate of revolution ($n_1$) and the second rate of revolution ($n_2$).

15. The method according to claim 1, further comprising starting the raising of the combustion gas pressure ($P_{in}$) when the rate of revolution (n) of the combustion engine shaft has fallen to a second rate of revolution ($n_2$), and before the combustion engine is reconnected with the driving wheels of the vehicle through the gearbox.

16. The method according to claim 1, further comprising maintaining a difference in pressure ($\Delta P_{motor}$) between the inlet and the outlet essentially constant during the reduction of the rate of revolution (n) for the combustion engine shaft.

17. The method according to claim 1, further comprising when the pressure ($P_{in}$) of the combustion gas is reduced, controlling the pressure in the combustion chamber towards essentially the pressure that surrounds the vehicle, or at least towards a pressure that is lower than a pressure that was prevalent at the beginning of the pressure-reduction process.

18. The method according to claim 1, further comprising, during the raising of the inlet pressure ($P_{in}$), raising the outlet pressure to a higher pressure compared with the pressure at the outlet before the increase of the currently prevalent inlet pressure to reduce the reduction of the differential pressure across the combustion engine during the raising of the inlet pressure ($P_{in}$).

19. The method according to claim 18, wherein the further raising of the outlet pressure ($P_{ut}$) essentially corresponds to the increase in pressure of the inlet pressure ($P_{in}$).

20. The method according to claim 18, wherein during the further raising of the outlet pressure ($P_{ut}$), increasing the outlet pressure ($P_{ut}$) to a level that exceeds a limitation on pressure with respect to non-instantaneous pressure that is prevalent at the outlet.

21. The method according to claim 1, further comprising performing the method essentially when the combustion engine is disengaged from all of the driving wheels.

22. The method according to claim 1, further comprising starting at least one of the increase in pressure ($P_{ut}$) at the outlet and the reduction of the inlet pressure before or when the combustion engine has been completely disengaged from the driving wheels.

23. A system for propulsion of a vehicle, wherein the vehicle comprises:
a combustion engine having a shaft to be driven by the engine, a gearbox between the combustion engine shaft and at least one driving wheel, wherein the gearbox is adjustable to a number of gear ratios for transfer of a force between the combustion engine and the at least one driving wheel;
the combustion engine comprises a combustion chamber having an inlet for supply of combustion gas and an outlet for evacuation of an exhaust gas flow that has resulted from combustion in the combustion chamber;
a turbocharger unit configured for pressurizing of the combustion gas in the combustion chamber;
during a change of gear from a first higher gear ratio to a second lower gear ratio in the gearbox, wherein a rate of revolution of the combustion engine shaft is reduced from a first rate of revolution to a second rate of revolution, the system comprising:
means for increasing a pressure ($P_{ut}$) at the outlet comprising at least the use of the turbocharger unit for constriction of exhaust gas flow;
means for reducing the pressure ($P_{in}$) at the combustion gas outlet from the combustion chamber through opening of a valve at the combustion gas outlet; and
when the first rate of revolution of the combustion engine shaft has at least partially fallen towards the second rate of revolution in the combustion chamber, means for controlling the turbocharger unit such that the combustion gas pressure ($P_{in}$) in the combustion chamber is increased.

24. The system according to claim 23, further comprising the combustion engine is constituted by any one of the group: vehicle engine, marine engine, and industrial engine.

25. The system according to claim 23, wherein the combustion engine is comprised of several of the combustion chambers.

26. The system according to claim 23, wherein the valve is located and configured to act against the high-pressure side of a compressor at the turbocharger unit, to reduce the pressure ($P_{in}$) at the combustion gas outlet from the combustion Chamber.

27. The system according to claim 26, further comprising a second valve that is configured and operable to cause recirculation of pressurized combustion gas to an inlet side of the compressor thereby reducing inlet pressure to the combustion chamber.

28. A vehicle that comprises a system according to claim 23.

* * * * *